United States Patent
McAninch et al.

(10) Patent No.: US 11,134,694 B2
(45) Date of Patent: Oct. 5, 2021

(54) COMPOSITIONS FOR AN METHODS OF LUBRICATING CARCASS CONVEYOR

(71) Applicant: Birko Corporation, Henderson, CO (US)

(72) Inventors: Terry L. McAninch, Henderson, CO (US); Bob Ogren, Henderson, CO (US); Elis Owens, Henderson, CO (US)

(73) Assignee: BIRKO Corporation, Henderson, CO (US)

( * ) Notice: Subject to any disclaimer, the term of this patent is extended or adjusted under 35 U.S.C. 154(b) by 0 days.

(21) Appl. No.: 16/911,105

(22) Filed: Jun. 24, 2020

(65) Prior Publication Data

US 2020/0390115 A1    Dec. 17, 2020

Related U.S. Application Data

(60) Provisional application No. 62/861,830, filed on Jun. 14, 2019.

(51) Int. Cl.
| | |
|---|---|
| *A22C 21/00* | (2006.01) |
| *B05B 5/025* | (2006.01) |
| *C10M 111/02* | (2006.01) |
| *C10M 111/04* | (2006.01) |
| *C10N 40/00* | (2006.01) |
| *C10N 70/00* | (2006.01) |
| *C10N 30/12* | (2006.01) |
| *C10N 80/00* | (2006.01) |

(52) U.S. Cl.
CPC ........ *A22C 21/0053* (2013.01); *B05B 5/0255* (2013.01); *C10M 111/02* (2013.01); *C10M 111/04* (2013.01); *C10M 2203/1006* (2013.01); *C10M 2205/0265* (2013.01); *C10M 2207/126* (2013.01); *C10M 2229/025* (2013.01); *C10N 2030/12* (2013.01); *C10N 2040/38* (2020.05); *C10N 2070/00* (2013.01); *C10N 2080/00* (2013.01)

(58) Field of Classification Search
CPC ............ A22C 21/0053; B05B 5/0255; C10M 111/02; C10M 111/04; C10M 2229/025; C10M 2203/1006; C10M 2207/126; C10M 2205/0265; C10N 2040/38; C10N 2070/00; C10N 2030/12; C10N 2080/00
See application file for complete search history.

(56) References Cited

U.S. PATENT DOCUMENTS

| | | | | |
|---|---|---|---|---|
| 4,828,727 | A * | 5/1989 | McAninch | C10M 101/02 508/534 |
| 8,716,205 | B2 * | 5/2014 | McAninch | C10M 111/04 508/212 |
| 2009/0298731 | A1 * | 12/2009 | Housel | C10M 105/38 508/485 |
| 2017/0013849 | A1 * | 1/2017 | Thippareddi | A23B 5/015 |

* cited by examiner

*Primary Examiner* — Cephia D Toomer
(74) *Attorney, Agent, or Firm* — Magleby, Cataxinos & Greenwood, P.C.

(57) ABSTRACT

An improved method for applying an electrically charged lubricant on an oppositely charged carcass trolley in a meat packing plant meeting the requirements of (1) adequate lubricity, (2) "drip-resistance," (3) safety, (4) rust resistance, (5) economy of manufacture and use, and (6) the ability to be removed by cleaning methods is provided by preparing a mixture of mineral oil, a fatty acid, a silicone oil, and a polybutene, each being acceptable for incidental contact with food.

19 Claims, 2 Drawing Sheets

COMPOSITIONS FOR AN METHODS OF LUBRICATING CARCASS CONVEYOR

CROSS-REFERENCE TO RELATED APPLICATIONS

This application claims priority to U.S. Provisional Patent Application No. 62/861,830 filed Jun. 14, 2019, of which is incorporated by reference herein.

FIELD OF THE INVENTION

The present invention relates to the field of lubrication and more particularly to the field of lubricating conveyors that carry animal carcasses in a meat packing plant. A novel electrostatic lubricant is used to provide adequate lubricity under the unique conditions encountered by such a conveyor, while minimizing animal waste resulting from contamination by dripping lubricant.

BACKGROUND INVENTION

In a meat packing plant, a conveyor is used for suspending an animal carcass in position to be trimmed and for moving the carcass from one station to another. Typically, a carcass is attached to the conveyor on the kill floor and moved by the conveyor into a "hot box" where the carcass is cooled rapidly. The conveyor then takes the carcass to the sales cooler where the carcass is graded and either sold to a customer or processed. The moving parts of the conveyor from which the carcass has been detached then pass through an area where they are cleaned to remove soil and bacteria particularly from the parts that contact the carcass. These conveyor parts then move through a rinsing station and pass through a hot lubricant tank where lubricant is reapplied. When the moving parts of the conveyor exit the lubricant tank, they are blow-dried or sprayed with water so that excess lubricant is removed before they reenter the kill floor for attachment of a new carcass.

Conveyors for meat packing plants generally include trolleys with attached gambrels, used for smaller carcasses, or attached hooks, used for larger carcasses. In both cases, a rail is mounted along the path that the carcass is to take as it is processed. A wheel having an annular groove formed therein rolls on the rail. An axle pin extends through the trolley for supporting the gambrel or the hook. Since the carcasses can weigh from 100 to 2300 pounds, there is a substantial load on the bearing surfaces of the pin and the wheel. These bearing surfaces must be lubricated so that the wheel will roll along the rail, making it easier for personnel or mechanical equipment to push the carcass along the path defined by the rail. If the lubricant is ineffective or becomes ineffective, it will be more difficult to move the carcass. In the worst case, the wheel does not rotate on the pin, such that the wheel becomes a "slider" that skids along the rail forming a "flat" on the surface of the wheel. This results in "down-time" to replace the wheel.

To avoid "sliders" the conveyor lubricant must function properly at the relatively warm and moist conditions existing in the kill room, where the carcass is first hung on the trolley; the cold and moist environment of the "hot box" where the temperature is maintained at or below 32° F. and the sales cooler where the temperature is at or slightly above 32° F. In the pork harvesting industry, the process bypasses the "hot box," and instead goes through a blast freezer (aka, a "snap freezer") for approximately 90 minutes at about −28° F. Thus, an important requirement for a lubricant used on a conveyor in a meat packing plant is that it be able to function both above and below the freezing temperature of water under a variety of conditions.

The lubricating properties of a lubricant are defined in terms of "lubricity" (i.e., the ability of the material to reduce friction and wear). In the practical sense of the term "lubricity" as applied to meat packing plant conveyors, the better the lubricity of a lubricant, the easier it is to push a given carcass along the conveyor, because a lubricant having good lubricity will enable the wheel to rotate relatively freely on the pin and to roll, not skid, along the rail. The lubricating properties of a lubricant are also defined by the "load bearing" capacity (aka, "wearability"), the ability of the lubricant to adhere and remain on the surface of the conveyor components.

A second key requirement for a lubricant used with a hook and trolley in a meat packing plant is that it be acceptable for use with products that are meant for human consumption. Because the conveyor is used in the processing of food for human consumption, the materials from which the lubricant is made and the resulting lubricant must comply with regulations of the U.S. Department of Agriculture (U.S.D.A.). Not all materials that have properties as a lubricant are sufficiently "non-toxic" to be safely used in food processing. For example, fluorinated hydrocarbons are frequently used in commercial lubricants and have very good lubricity and high temperature stability. However, they are not sufficiently "non-toxic" and, therefore, have not been approved by the U.S.D.A. for incidental contact with food. The U.S.D.A. regulations determine what materials may safely contact food products and, where appropriate, place limitations on the amount of such material which may safely remain on food products.

In particular, the Food and Drug Administration Regulations that govern the U.S.D.A.'s inspection service (21 CFR § 178.3570) list certain materials which may be safely used on machinery for processing food where incidental contact with the food may occur. Among the materials generally listed as "lubricants" in that Section are certain fatty acids and oleates, certain mineral oils, and certain polybutenes and polyisobutylenes. However, mineral oil alone does not have sufficient lubricity to be acceptable as a carcass conveyor lubricant. Also, certain of the listed lubricants have limited permissible usage. For example, the polyisobutylenes are limited to use as a thickening agent in mineral oil lubricants.

21 CFR § 178.3570 lists the following as lubricants for incidental contact with food as follows:

"Polybutene (minimum average molecular weight 80,000). Addition to food not to exceed 10 parts per million.

Polybutene, hydrogenated; complying with the identity prescribed under § 178.3740.

Polyisobutylene (average molecular weight 35,000-140,000 [Flory]). For use only as a thickening agent in mineral oil lubricants."

Silicone compounds are registered as H1 lubricants that are approved for incidental food contact in food processing and food processing applications. In addition, silicone meets FDA 21 CFR 175.300 requirements for use as a lubricant for incidental contact with food. Silicone sprays are recommended to prevent plastic and foam from sticking in food processing and packaging areas. Suitable silicone compounds typically have a viscosity greater than about 300 centistokes.

The U.S.D.A. regulations list materials which may be used in food processing generally. There is no suggestion or recommendation on the U.S.D.A.'s approved list to use any of these materials specifically as a lubricant in a meat packing plant under the various conditions encountered there.

The classification of a material as being suitable for "incidental contact" with food means that the food contacted by the material should still be safely edible. Since the amount of the material which can be retained on the food and safely eaten may not exceed a defined number of parts per million established by the U.S.D.A., incidental contact of the material with the food should be minimized.

Incidental contact of lubricant with carcasses suspended from a conveyor in a meat packing plant occurs when the lubricant flows from the bearing surfaces of the pin and the wheel and from other surfaces of the gambrel or trolley under the force of gravity and drips onto the exposed surfaces of the carcass below. Part of the U.S.D.A.'s rigorous inspection of carcasses during processing is to detect lubricant that has dripped onto each carcass. By shining a bright light onto the carcass an inspector can locate areas contaminated by lubricant which reflect the light differently than the uncontaminated surfaces of the carcass. After the areas of lubricant contamination have been located on the carcass, the carcass is trimmed to remove the portions of meat containing lubricant. The carcass is then subject to re-inspection.

The necessity to trim, re-inspect and, if necessary, re-trim lubricant contaminated meat takes extra time, which increases the meat packer's costs. It also unnecessarily reduces the weight of the carcass, which lowers carcass yield and the meat packer's revenue.

The "dripping problem" results from the flow of lubricant from the conveyor surfaces, especially from the bearing surfaces of the pin and the wheel, after the carcass has been suspended from the conveyor. In addition, it is desirable to minimize lubricant dripping prior to carcass application, since the drip may land on other parts of the conveyor equipment which subsequently cause contamination of the meat. A lubricant that is relatively "drip-resistant" is one that drips a minimal amount from the conveyor surfaces under the temperature and load conditions that exist both before and after the carcass has been hung on the conveyor. A third requirement for an acceptable hook and trolley lubricant, therefore, is that it be sufficiently "drip-resistant" to minimize lubricant contact with the meat resulting in waste.

Attempts have been made to reduce the dripping problem. As early as 1975, attempts were made to use thinner (or less viscous) lubricants at the elevated temperatures (e.g., 175° F.) at which the lubricant is typically applied to the conveyor parts. The theory was that this would make it easier to remove excess lubricant from conveyor parts by the air blower or water spray. If most, if not all, of the excess lubricant were removed, then only a thin lubricant layer would remain on the conveyor parts minimizing the risk of lubricant subsequently dripping on the carcass after it was hung on the conveyor. However, experience indicated that the use of less viscous lubricants did not result in an adequate residual coating of lubricant on the moving conveyor parts and, therefore, did not provide sufficient lubricity on the conveyor for the carcass loads.

Other attempts to minimize the dripping problem while maintaining desired lubricity utilized substantially thicker (i.e., more viscous) lubricants with viscosities in excess of 200 centipoise ("cp"). The theory was that these lubricants would flow so slowly that they would not drip onto the carcasses. However, this very same property prevented enough excess lubricant from being removed by the air or water spray following the lubricating step. As a result, so much lubricant was retained on the gambrel and trolley components that the lubricant oozed and dripped excessively after loading of the carcass onto the conveyor. Although attempts were made, a way could not be found to apply successfully only a thin layer of these viscous materials.

Within the limitations imposed by compliance with the U.S.D.A. regulations, others have attempted using fatty acids to lubricate conveyors in meat packing plants. For example, castor oil or coco fatty acid have been used alone or in various mixtures with mineral oil. The fatty acids provide the lubricity lacking in the mineral oil but increase the cost of the lubricant. Moreover, it has been noted that these mixtures do not have enough "drip-resistance" to minimize the dripping problem.

Others have tried mixing acetylated monoglycerides with mineral oil, which results in a lubricant having increased chemical stability and drip-resistance, but reduced lubricity.

In addition to the previously discussed requirements regarding lubricity, safety, and drip-resistance, there are other requirements for an acceptable lubricant useful in conveyors for meat packing plants. An acceptable lubricant should be rust resistant or rust inhibiting to avoid damage and deterioration of conveyor parts. Thus, the components of any lubricant mixture must also be compatible with an anti-rust additive, which itself must meet the safety requirements of the U.S.D.A.

In addition, the lubricant must be capable of being cleaned from the conveyor parts, which contact the carcass as these parts pass through each cleaning cycle on the conveyor. It is necessary to remove lubricant, dirt, and bacteria by steam, dissolution, or mechanical means to prevent the buildup of bacteria in the plant. On the other hand, the lubricant should not be so easily removable that lubricity is lost from load bearing or moving surfaces. It is difficult to reapply lubricant effectively to these important surfaces, if the lubricant were totally removed.

From the view of both plant operators and the lubricant manufacturer, the cost of the lubricant components should be as low as possible. In today's competitive meat industry, substantial amounts of money cannot be afforded for production costs. Indeed, the major impetus for use of a drip-resistant lubricant is to reduce costs. If this can be accomplished with a competitively priced lubricant, the cost savings for the meat packer are considerable.

Finally, to reduce manufacturing costs, the components of the lubricant should be relatively easy to handle. Heating, which may be required to change the physical properties of the lubricant material, should be minimized to reduce costs.

In summary, for many years there have been unsuccessful attempts to find lubricants that can optimize all the foregoing qualities: lubricity, safety, "drip-resistance," rust resistance, economy of manufacture and use, and "cleanability." Although, meat packers have switched lubricants often in an attempt to obtain a satisfactory lubricant, they continue to incur increased costs and lower revenues than possible with the improved lubricant of this invention.

SUMMARY OF THE INVENTION

A particular embodiment of the present invention provides a method to apply an electrostatic lubricant composition suitable for use with a conveyor in a meat packing plant which meets the requirements of: (1) adequate lubricity; (2) "drip-resistance"; (3) safety (i.e., approval of the composition and its ingredients by the U.S.D.A.); (4) rust resistance; (5) economy in manufacture and use; and (6) the ability to be removed by cleaning methods.

Another embodiment of the present invention provides a method of increasing the drip-resistance of lubricants for carcass conveyors without sacrificing lubricity of the lubricant, all without excessively increasing lubricant cost or sacrificing other desirable properties.

A further object of the present invention is to provide a mixture of components, each of which is approved by the U.S.D.A. for incidental contact with food, for electrostatically lubricating bearing surfaces of a carcass trolley while minimizing lubricant dripping and maintaining lubricity.

A conveyor lubricant according to the present invention provides improved combination of properties including "drip-resistance" and lubricity by mixing mineral oil, lubricant materials such as fatty acids, silicone oil; and polybutene in certain minimum amounts to form a lubricant mixture, and then charging the lubricant mixture to create and apply an electrostatic lubricant mixture to the conveyor machinery, which is maintained at an electrostatic potential different than that of the lubricant mixture. In particular embodiments, the lubricant mixture can have a viscosity in the range of 5-160 centipoise, or alternatively 20-160 centipoise.

The invention also includes a method of improving a lubricant for use on one or more parts of conveyor machinery (e.g., a carcass trolley) comprising the steps of selecting the lubricant components from a mineral oil, a silicone oil, a fatty acid, and a polybutene each being acceptable for incidental contact with food; mixing such ingredients in certain minimum amounts and increasing the percentage by weight of these components to produce a lubricant mixture, followed by charging the lubricant mixture and the conveyor machinery parts with opposite charges to provide electrostatic application of the lubricant mixture to the conveyor machinery, which is maintained at an electrostatic potential different than that of the lubricant mixture. In particular embodiments, the lubricant mixture can have a viscosity in the range of 5-160 centipoise, or alternatively 20-160 centipoise.

Finally, present invention may achieve an improved method for lubricating conveyor machinery in a meat packing plant including the steps of selecting the lubricating components from a mineral oil, fatty acid, silicone oil, and polybutene, each of which is acceptable for use for incidental contact with food, mixing these components in certain minimum percentages, increasing the amount of one or more components to obtain a lubricant mixture, charging the lubricant mixture and the conveyor machinery with opposite charges to provide electrostatic application of the lubricant mixture to the conveyor machinery, which is maintained at an electrostatic potential different than that of the lubricant mixture. The lubricant mixture is then applied to the machinery. In particular embodiments, the lubricant mixture can have a viscosity in the range of 5-160 centipoise, or alternatively 20-160 centipoise.

BRIEF DESCRIPTION OF THE DRAWINGS

Other features and advantages of the present invention will be apparent from an examination of the following detailed description which includes the attached drawings in which.

DETAILED DESCRIPTION OF THE INVENTION

Figure 1:
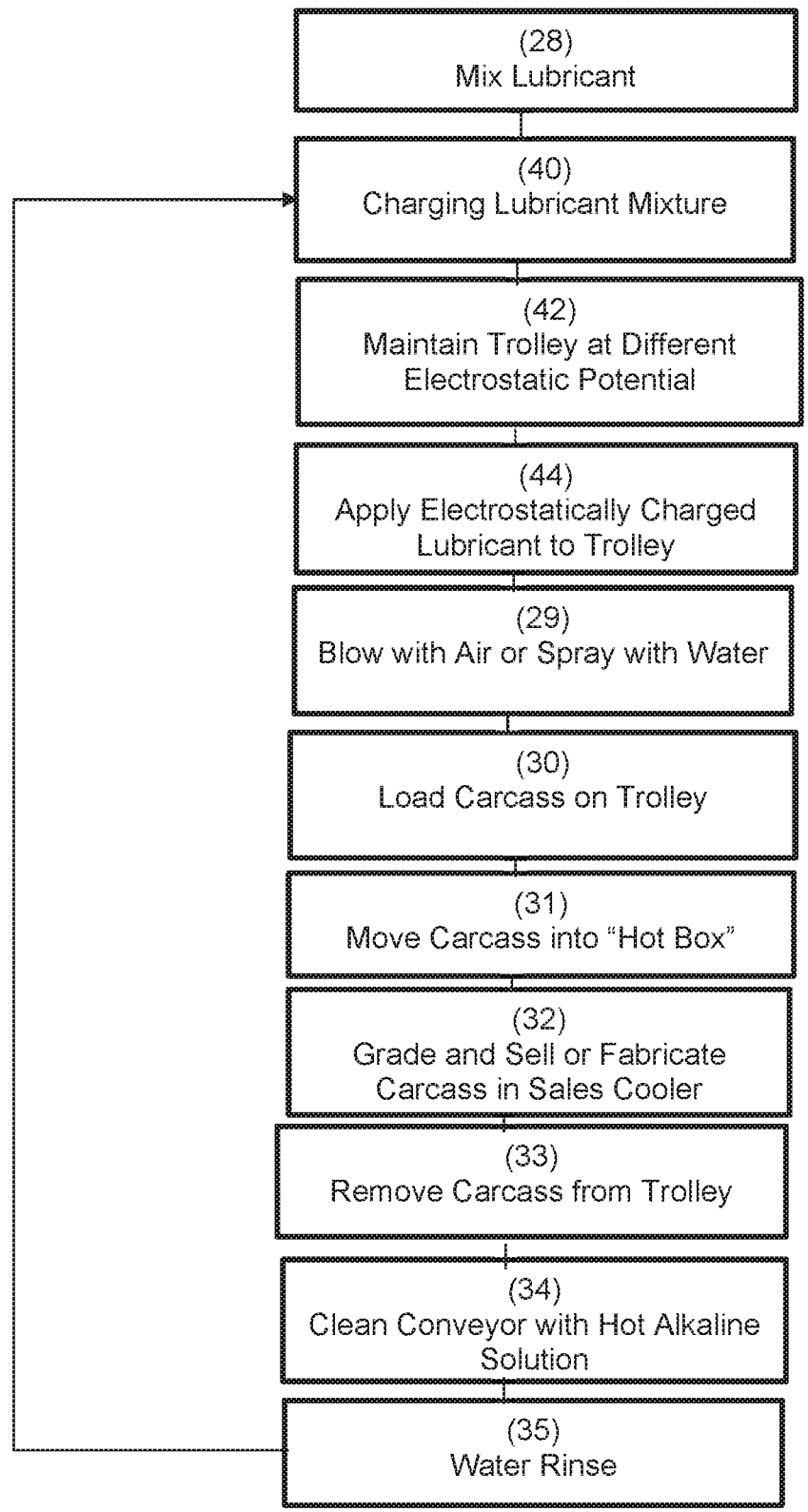
FIG. 1 is a flow chart identifying the steps taken to prepare a trolley for carrying a carcass during the processing of food for human consumption, where the step of lubricating the trolley is according to the method of the present invention.
Figure 2:
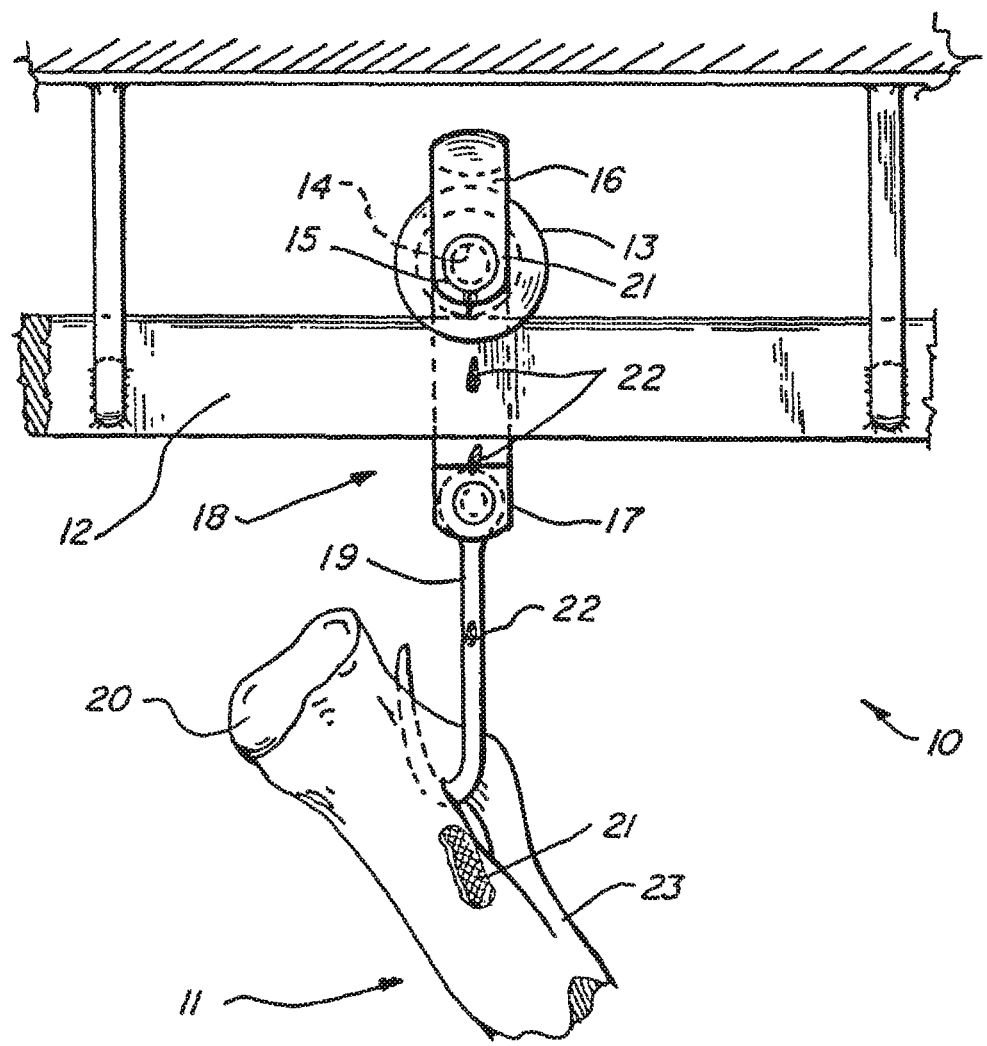
FIG. 2 is a side view of the carcass conveyor showing part of a carcass suspended from a trolley that is supported by a rail. The lubricant drip problem is illustrated by drips of lubricant falling from the trolley onto the carcass.

In FIG. 1, there are shown the steps in the process of preparing the trolleys 18 of such conveyor 10 for carrying the carcass 11 as shown in FIG. 2.

In preparation for a lubrication step 27, in a step 28 components of the lubricant 21 are mixed in accordance with the following description to produce the lubricant 21 having desirable lubricity properties and improved drip-resistance. The lubricant 21 is fed into a tank (not shown) that is maintained at an elevated temperature, typically about 170° F. In step 40, the lubricant mixture 21 is charged and maintained there for a period of time (in some embodiments, about 10 seconds). In step 42, the trolley 18 is maintained at a different electrostatic potential by applying a charge opposite of that used to create the electrostatically charged lubricant. In step 44, the electrostatically charged lubricant is applied to one or more parts of the trolley 18 in order to permit the electrostatically charged lubricant 21 to thoroughly coat the bearing surfaces on the hanger 17 and on the bearing surfaces between an axle pin 14 and a wheel 13, so that the hook/gambrel will move freely relative to the hanger 17 and so that the wheel 13 will rotate freely relative to the axle pin 14. The charged lubricant will then be drawn to desired surfaces of the trolley 18 by electrostatic attraction.

In an alternative embodiment, step 40 is not conducted. Instead, the lubricant mixture 21 is charged when emitted from a spray device (e.g., an electrostatic sprayer or nozzle) toward the trolley. The system may be in the form of any suitable apparatus for applying an electrostatic enhanced lubricant. The lubricant may be transported to the spray device in a fluid stream such as air, or in the form of liquid, or the like. The lubricant may be atomized by the spray device utilizing conventional air atomization, hydraulic atomization, and/or rotary atomization. The spray device may include one or more electrodes which cause the particles emitted by the spray device to carry an electrostatic charge such that when the charged lubricant are propelled by the spray device toward the trolley. One or more parts of the trolley 18 (e.g., wheel 13, axle pin 14, and/or hanger 17) are maintained at an electrostatic potential different than that of the charged coating particles, such that the coating particles will be deposited on the trolley with improved efficiency and coverage.

In all of the embodiments herein, the electrical charge transfer mechanism may involve any suitable means, such as contact charging, corona charging, inductive charging, and/or ionization, etc. in accordance with charging principles which are well known in the electrostatic field.

With continued reference to FIG. 1, the freely rotatable wheel 13 will roll along rail 12, even under the weight of the carcass 11, so as to decrease resistance and to avoid forming sliders. At the elevated temperature the lubricant 21 flows more thoroughly onto the bearing surfaces of the axle pin 14 and the wheel 13, and hanger 17. Due to the differential electrostatic charges between the lubricant and the trolley, the lubricant can coat the entire trolley, including non-moving parts to inhibit rust under the hot, steamy conditions from the kill floor and the cold, moist conditions in the "hot box." The use of electrostatically charged lubricant on a trolley having a different electrostatic potential will also reduce drip and reduce the amount of lubricant needed.

In the next step 29, the trolley 18 optionally can be blown with air so as to remove excess lubricant 21 that may be retained on the outside of the various parts of the trolley 18. Alternatively, the trolley 18 optionally may be sprayed with water to remove the excess lubricant. Using the electrostatically charged lubricant 21 of the present invention, a minimum of excess lubricant will be retained on the trolley 18 following step 29. Also, consistent with the improved "drip-resistant" properties of the electrostatically charged lubricant 21 of the present invention, dripping of the lubricant 21 from the trolley after the blowing or spraying step 29 is minimized or eliminated.

The next step 30 is shown as loading the carcass 11 on hooks 19 or gambrels (not shown) of the trolley 18. Such loading of the carcass 11 is done in the kill room, where the ambient temperature is generally in the range of 80° F.-90° F. Any given trolley 18 may be loaded with a carcass 11 very soon after the blowing or spraying step 29, or there may be a delay in such loading, all according to the rate at which carcasses 11 are being processed in the meat packing plant and the number of trolleys 18 that are in service. Since the lubricant 21 must be suitable for use when such delay is minimal, the amount of dripping of the lubricant 21 from the trolley 18 should be minimal immediately after application of the electrostatic lubricant or the blowing (or spraying) step 29. In other words, the "drip-resistant" properties of the lubricant 21 should be effective before carcass 11 is loaded onto the trolley 18.

With the weight of the carcass 11 on one or more of the trolleys 18, as the carcass 11 is moved along the path defined by the rail 12, the rolling of the wheel 13 tends to remove the lubricant 21 from the bearing surfaces of the wheel 13 and the axle pin 14. The lubricant 21 must also have a viscosity and electrostatic potential sufficient to resist such removal and should have sufficient load bearing capacity to lubricate such bearing surfaces under the weight of the carcass 11. These properties are required at the ambient temperature in the kill room, which as noted above can be in the range of 80° F.-90° F. The carcass 11 is hung from the trolley as soon as the shank is skinned. The carcass 11 is kept in the kill room suspended on the trolley 18 as the remainder of the carcass 11 is skinned, the head is removed, the carcass is gutted, and the carcass is inspected, trimmed and washed. This usually takes about 20 minutes. The exposure in the kill room at elevated temperatures is sufficiently long that the less drip-resistant lubricants of the prior art tend to flow easily and drip excessively onto the carcasses below.

The present invention also has application in large pork plants that use blast freezers. As most hogs are dehaired (as opposed to being skinned), the gambrel is inserted immediately after the hog exits the dehairing machine. The hog carcasses typically go to a blast freezer in place of the hot box, and then go directly into a tempering cooler at 34 F.

The carcass 11 is then moved into the "hot box" (step 31) where the ambient temperature is below 32° F., generally at about 26° F. The carcass 11 is generally kept there for up to 24 hours to permit the carcass 11 to cool. During that period of time, chilled water at a temperature at or near freezing may periodically be sprayed over the carcasses to help cool the carcasses and to reduce shrinkage. Because of the length of time in the "hot box" and the periodic water spray, the prior art lubricants typically dripped from the conveyor to the carcasses below, even through the temperatures were quite cold. In contrast, the lubricant 21 of the present invention substantially reduces the drip problem even though the carcass 11 typically remains suspended on the trolley 18 in the "hot box" for 24 hours and is subjected to the water spray. Since the carcass 11 must be moved within the "hot box," the lubricant 21 must also retain its lubricity at these colder temperatures.

In step 32, the carcass 11 is moved into the sales cooler and graded. The ambient temperature of the sales cooler is usually about 34° F., or slightly above the freezing temperature of water. In the sales cooler, the meat may be sold in bulk to customers or it may be fabricated by the meat packer. If it is sold, the carcass may be removed from the trolley for delivery to the customer or both the trolley and carcass may be delivered to the customer. The practice in the industry is for customers to return uncleaned trolleys to the packing plant where they are typically reattached to the conveyor in the sales room.

If a decision is made to fabricate the carcass, it may be kept in the sales cooler for up to 16 hours. The lubricant 21 must continue to retain improved drip-resistance and lubricity during this time period. During fabrication, the remainder of the carcass 11 is removed from the trolley 18 (step 33). After the carcass is removed, the trolley 18 then exits the sales cooler and is sent to step 34 for cleaning.

At a cleaning station (step 34), a hot alkaline solution is applied to the trolley 18, including a hanger 17, the wheel 13, the axle pin 14, and the bearing surfaces between the wheel 13 and the axle pin 14 by dipping them in the solution. The solution removes any remaining portions of the carcass 11, dirt, lubricant, and bacteria from the parts of the conveyor 10 which come in contact with the meat. In the next step 35, these parts of the conveyor 10 are rinsed with water to remove the alkaline solution.

The drip problem that is minimized by the method of the present invention and by using the electrostatically charged lubricant of the present invention may be understood by referring to FIG. 2, where a representative conveyor 10 used in meat packing plants is shown for suspending an animal carcass 11 in position to be trimmed. The conveyor 10 includes a rail 12 mounted along a path that the carcass 11 is to take as it is processed. A wheel 13 having an annular groove (not shown) formed therein rolls on the rail 12. The axle pin 14 extends through a hole 15 in the wheel 13 for supporting spaced arms 16 that extend upwardly and join the hanger 17 that extends downwardly beneath the rail 12. Bearing surfaces (not shown) are provided on the axle pin 14 and the hole 15 of the wheel 13. This assembly that is supported on the wheel is referred to as a trolley 18. In the trolley 18 shown in FIG. 2, the hook 19 extends through the hanger 17 and supports one leg 20 of the carcass 11 that is to be processed as it is moved through the meat packing plant. For lighter animals, a gambrel (not shown) supports both hind legs of the carcass 11 to be processed.

The dripping problem is illustrated in FIG. 2. Excess lubricant 21 around the pin 14, the arms 16, and the wheel 13 has flowed under the influence of gravity to form a drop 22. A previously formed drop 22 of the lubricant 21 is shown falling onto the carcass 11. Lubricant 21 is shown on an exposed surface 23 of the carcass 11. Since the lubricant 21 is only approved by the U.S.D.A. for incidental contact with the carcass, the U.S.D.A. Inspector must quickly find any lubricant 21 on the carcass, the lubricant 21 must be removed promptly from the carcass 11 by trimming the carcass 11, and then the carcass 11 is subject to reinspection to determine that all of the lubricant 21 has been removed via the trimming operation.

A method of the present invention renders a carcass conveyor lubricant more drip-resistant, without any substantial adverse effect on the lubricity of such lubricant or the other properties desirable for a lubricant used on a trolley in a meat packing plant. This involves the novel electrostatically charged mixture of polybutene, silicone oil, fatty acid, and mineral oil.

The combined properties including lubricity and drip-resistance of the lubricant 21 will be maximized when these components are used in the following minimum percentages by weight and with the lubricant 21:

|  | Minimum % By Weight |
| --- | --- |
| Fatty Acid | 2.5% |
| Mineral Oil | 50.0% |
| Silicone Oil | 1.0% |
| Polybutene | 3.0% |

In particular embodiments, the weight of each such component that is required to result in the lubricant 21 having a viscosity in the 5-160 or 20-160 centipoise range will vary according to the viscosity of each component. As such, it is understood that a person of skill in the art may modify the amount of each component making up the lubricant according to viscosity of each component in order to formulate a desired lubricant and vary the viscosity of the lubricant mixture.

Reference to the Renoil brands of mineral oil in the Charts below are to food grade mineral oils sold by Renkert Oil, Elverson, Pa. 19520, having an SUS viscosity indicated by the brand number. In particular examples, the lubricant contains at least 65% to 90% by weight of mineral oil. In other embodiments, the lubricant contains at least 80% to 85% by weight of mineral oil.

Suitable fatty acids for use in the present invention include one or more food grade fatty acids, such as, for example, stearic acid and oleic acid. Representative oleic acids suitable for use in the invention includes Emersol brand oleic acid sold by Emery Oleochemicals LLC, Cincinnati, Ohio 45232, and Pamolyn brand oleic acid sold by Hercules, Incorporated, Wilmington, Del. The listed molecular weights can be obtained by the vapor phase method and the viscosity in centipoise can be obtained with a Brookfield viscometer. Other fatty acids commonly used to provide lubricity may be used including castor oil, coco fatty acid, vegetable oils and others. In particular examples, the lubricant contains at least 2.5% to 15% by weight of at least one fatty acid.

Silicone oils suitable for use with the present invention include any food grade polymerized siloxanes with organic side chains, silicon analogues of carbon-based organic compounds, and related structures that form molecules based on silicon rather than carbon. In a particular embodiment, the silicone oil of the mixture can include a polydimethylsiloxane (PDMS) having a viscosity of 350 cp. or a combination of PDMSs having a combined viscosity of 350 cp., such as those available from various companies such as GE, Dow Corning, Wacker, Rhodorsil, and Shinetsu. It has been observed that silicone oil tends to cling preferentially to metal surfaces during the process of conveying a meat carcass through a conveyor in a meat packing plant, thereby reducing dripping. Additionally, it has been observed that inclusion of silicone oil to the lubrication mixture reduced the oxidation of the fatty acid(s) in the lubricant mixture, thus prolonging the service life of the lubricant mixture.

The INDOPOL brand polybutenes are sold by Amoco Chemicals Corporation, Chicago, Ill. 60601. Another representative polybutene suitable for use with the invention includes Parapol 950 polybutene, which is sold by Exxon Chemicals, Houston, Tex. 17001. These polybutenes are not, as such, listed in 21 CFR § 178.3570. Since they include a basic isobutylene-butene copolymer that is acceptable under 21 CFR § 177. 1430(b)(3), they are approved for use as a component of non-food articles that comply with 21 CFR § 178.3570. Specifically, the INDOPOL brand polybutenes are made by polymerizing an isobutylene-rich butene stream with a metal halide catalyst. The polymer backbone structure resembles polyisobutylene, although more 1- and 2-butenes are incorporated in the lower molecular-weight fractions. There is a molecular weight distribution of the grades of such INDOPOL brand polybutenes. Because of their highly substituted structure, polybutenes have very low glass-transition temperatures and pour points. Such INDOPOL brand polybutenes are composed predominantly of high molecular weight mono-olefins (85-98%), the balance being isoparaffins. The olefin structure is predominantly the tri-substituted type (R—CH=CR$_2$). Only minor amounts of vinylidene

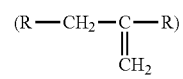

and terminal vinyl (R—CH=CH$_2$) structures are present.

The major component of polybutenes can be represented as:

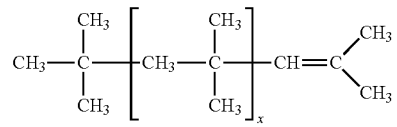

It is understood that some internal double bonds may exist. In particular examples, the lubricant contains at least 3% to 30% by weight of polybutene. In other examples, the lubricant contains at least 3% to 10% of polybutenes.

In addition, the mixtures of this invention may contain any of the commonly recognized U.S.D.A. rust inhibitors, antioxidants, or surfactants in amounts consistent with the general principles set forth herein.

In a particular embodiment of the invention, the lubricant for use on conveyor machinery in a food processing plant includes the following:

| Description | Quantity |
| --- | --- |
| Renoil[1] 70W | 6.12799 LB |
| GE Silicone[2] SF96-350 | 0.14251 LB |
| Stearic Acid | 0.07126 LB |
| Indopol[3] H-100 | 0.28502 LB |
| Oleic Acid (Emersol 233) | 0.49879 LB |

[1] Renoil is a brand name for white mineral oil.
[2] GE Silicones SF96-350 is a brand name for silicone oil.
[3] Indopol is a brand name for polybutene.

It is understood that the lubricant may also contain other commonly recognized U.S.D.A. rust inhibitors, antioxidants, or surfactants to obtain a lubricant suitable for particular applications and operating parameters.

In particular embodiments of the invention, the lubricant for use on conveyor machinery in a food processing plant will include the following:

CHART I (Mixture 1)

| Component | Brand | Percent (%) By Wt. | Molecular Wt. | Viscosity |
|---|---|---|---|---|
| Mineral Oil | Sontex 55 | 74% | N/A | 12 cp. |
| Polybutene | Indopol H35 | 20% | 600 | 81 cSc* |
| Fatty Acid | Pamolyn 100 | 5% | 282 | 34 cp. |
| Silicone Oil | GE Silicone SF96-350 | 1% | N/A | 350 cSc** |
| Mixture | N/A | 100% | N/A | 20 cp. |

*Viscosity of Indopal polybutene was measured in centiStokes at 99° C.
**Viscosity of GE Silicone SF96-350 was measured in centiStokes at 25° C.

CHART II (Mixture 2)

| Component | Brand | Percent (%) By Wt. | Molecular Wt. | Viscosity |
|---|---|---|---|---|
| Mineral Oil | Sontex 55 | 70.5% | N/A | 12 cp. |
| Polybutene | Indopol H50 | 23.5% | 750 | 125 cSt |
| Fatty Acid | Pamolyn 100 | 5% | 282 | 34 cp. |
| Silicone Oil | GE Silicone SF96-350 | 1% | N/A | 350 cSc |
| Mixture | N/A | 100% | N/A | 24 cp. |

CHART III (Mixture 3)

| Component | Brand | Percent (%) By Wt. | Molecular Wt. | Viscosity |
|---|---|---|---|---|
| Mineral Oil | Sontex 55 | 73% | N/A | 12 cp. |
| Polybutene | Indopol H100 | 20% | 920 | 35,900* 985** |
| Fatty Acid | Pamolyn 100 | 5% | 282 | 34 cp. |
| Silicone Oil | GE Silicone SF96-350 | 2% | N/A | 350 cSc** |
| Mixture | N/A | 100% | N/A | 28 cp. |

*SUS @ 38° C. (100° F.)
**SUS @ 99° C. (210° F.)

CHART IV (Mixture 4)

| Component | Brand | Percent (%) By Wt. | Molecular Wt. | Viscosity |
|---|---|---|---|---|
| Mineral Oil | Sontex 150 | 64.7% | N/A | 150 cp. |
| Polybutene | Indopol H25 | 20% | 610 | 56 cSt |
| Fatty Acid | Pamolyn 100 | 4.8% | 282 | 34 cp. |
| Silicone Oil | GE Silicone SF96-350 | 1% | N/A | 350 cSc** |
| Rust Inhibitor | S-maz 80 | 0.1% | N/A | N/A |
| Mixture | N/A | 100% | N/A | 156 cp. |

CHART V (Mixture 5)

| Component | Brand | Percent (%) By Wt. | Molecular Wt. | Viscosity |
|---|---|---|---|---|
| Mineral Oil | Sontex 150 | 70.1% | N/A | 150 cp. |
| Polybutene | Indopol H25 | 24% | 610 | 56 cSt |
| Fatty Acid | Pamolyn 100 | 4.8% | 282 | 34 cp. |
| Silicone Oil | GE Silicone SF96-350 | 2% | N/A | 350 cSc** |
| Rust Inhibitor | S-maz 80 | 0.1% | N/A | N/A |
| Mixture | N/A | 100% | N/A | 20 cp. |

CHART VI (Mixture 6)

| Component | Brand | Percent (%) By Wt. | Molecular Wt. | Viscosity |
|---|---|---|---|---|
| Mineral Oil | SUS 150 | 87.7% | N/A | 150 cp. |
| Polybutene | Parapol 950 | 6.3% | 950 | 220 cSt* |
| Fatty Acid | Pamolyn 100 | 4.9% | 282 | 34 cp. |
| Silicone Oil | GE Silicone SF96-350 | 2% | N/A | 350 cSc** |
| Rust Inhibitor | S-maz 80 | 0.1% | N/A | N/A |
| Mixture | N/A | 100% | N/A | 74 cp. |

*Viscosity of Parapol was measured in Centistokes at 100° C. Parapol 950 is sold by Exxon Chemicals, P.O Box 3272, Houston, TX 17001.

CHART VII (Mixture 7)

| Component | Brand | Percent (%) By Wt. | Molecular Wt. | Viscosity |
|---|---|---|---|---|
| Mineral Oil | Sontex 55 | 80.3% | N/A | 150 cp. |
| Polybutene | Parapol 950 | 4.7% | 950 | 220 cSt |
| Fatty Acid | Pamolyn 100 | 14.0% | 282 | 34 cp. |
| Silicone Oil | GE Silicone SF96-350 | 1% | N/A | 350 cSc |
| Mixture | N/A | 100% | N/A | 24 cp. |

Application of the electrostatically charged lubricant to the trolley having the opposite electrostatic potential tends to make the lubricant cling preferentially to metal surfaces of the trolley during the process of conveying a meat carcass through a conveyor in a meat packing plant, thereby reducing dripping from the trolley.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A method of applying a lubricant on conveyor machinery used in a meat packing plant, wherein such lubricant is electrically charged and safe for incidental contact with food; comprising:
   selecting the lubricant components from a mineral oil, at least one fatty acid, at least one H1 silicone oil, and a polybutene, each component being acceptable for incidental contact with food;

mixing such mineral oil, at least one fatty acid, at least one H1 silicone oil, and polybutene in at least the following minimum percentages by weight:

| | |
|---|---|
| Fatty Acid | 2.5% |
| Mineral Oil | 50% |
| Polybutene | 3% |
| H1 Silicone Oil | 1%; | applying an electrical charge to one or more portions of a carcass trolley;
applying an opposite electrical charge to the lubricant to form an electrostatically charged lubricant; and
applying the electrostatically charged lubricant to one or more portions of the carcass trolley.

2. The method of claim 1, wherein applying an opposite electrical charge to the lubricant to form an electrostatically charged lubricant comprises applying an electrical charge to the lubricant in a container.

3. The method of claim 1, wherein applying an opposite electrical charge to the lubricant to form an electrostatically charged lubricant comprises applying an electrical charge to a sprayer or nozzle capable of electrically charging the lubricant.

4. The method of claim 1, wherein applying an electrical charge or an opposite electrical charge comprises contact charging, corona charging, inductive charging, and/or ionization.

5. The method of claim 1, further comprising mixing a rust inhibitor to said mineral oil, at least one fatty acid, at least one H1 silicone oil, and polybutene.

6. The method of claim 1, wherein at least 65% to 90% by weight of mineral oil is added to said mixture.

7. The method of claim 1, wherein said at least one fatty acid comprises stearic acid and oleic acid.

8. The method of claim 1, wherein at least 2.5% to 15% by weight of at least one fatty acid is added to said mixture.

9. The method of claim 1, further comprising increasing the percentage by weight of said mineral oil, at least one fatty acid, silicone oil, and polybutene to form a lubricant mixture having a viscosity in the range of 20-160 cp.

10. The method of claim 1, wherein said mixture comprises:
about 85% by weight of mineral oil;
about 8% by weight of at least one fatty acid;
about 2% by weight of at least one H1 silicone oil; and
about 4% by weight of polybutene.

11. The method of claim 1, further comprising increasing the percentage by weight of said mineral oil, at least one fatty acid, silicone oil, and polybutene to form a lubricant mixture having a viscosity in the range of 20-160 cp.

12. The method of claim 11, wherein applying an opposite electrical charge to the lubricant to form an electrostatically charged lubricant comprises applying an electrical charge to the lubricant in a container.

13. The method of claim 11, wherein applying an opposite electrical charge to the lubricant to form an electrostatically charged lubricant comprises applying an electrical charge to a sprayer or nozzle capable of electrically charging the lubricant.

14. The method of claim 11, wherein applying an electrical charge or an opposite electrical charge comprises contact charging, corona charging, inductive charging, and/or ionization.

15. The method of claim 11, further comprising mixing a rust inhibitor to said mineral oil, at least one fatty acid, at least one H1 silicone oil, and polybutene.

16. The method of claim 11, wherein at least 65% to 90% by weight of mineral oil is added to said mixture.

17. The method of claim 11, wherein said at least one fatty acid comprises stearic acid and oleic acid.

18. The method of claim 11, wherein at least 2.5% to 15% by weight of at least one fatty acid is added to said mixture.

19. The method of claim 11, wherein said mixture comprises:
about 85% by weight of mineral oil;
about 8% by weight of at least one fatty acid;
about 2% by weight of at least one H1 silicone oil; and
about 4% by weight of polybutene.

* * * * *